US005540571A

United States Patent [19]

Yoshida et al.

[11] Patent Number: 5,540,571

[45] Date of Patent: Jul. 30, 1996

[54] SCROLL-TYPE COMPRESSOR HAVING BOLTED HOUSINGS

[75] Inventors: Tetsuo Yoshida; Tetsuhiko Fukanuma; Masao Iguchi, all of Kariya; Yuichi Tsumagari, Toyokawa; Yuuji Yamamoto, Toyota, all of Japan

[73] Assignees: Kabushiki Kaisha Toyoda Jidoshokki Seisakusho, Aichi; Nippondenso Co., Ltd., Aichi-Pref., both of Japan

[21] Appl. No.: 336,541

[22] Filed: Nov. 9, 1994

[30] Foreign Application Priority Data

Nov. 10, 1993 [JP] Japan .................................... 5-281439

[51] Int. Cl.$^6$ ............................ F04C 18/04; B23P 11/00

[52] U.S. Cl. ........................ 418/55.1; 29/428; 29/888.022

[58] Field of Search ................................ 418/55.1, 55.5; 29/888.022, 428

[56] References Cited

U.S. PATENT DOCUMENTS

| | | | |
|---|---|---|---|
| 3,994,633 | 11/1976 | Shaffer | 418/55.1 |
| 4,332,535 | 6/1982 | Terauchi et al. | 418/55.6 |
| 4,411,604 | 10/1983 | Terauchi | 418/55.1 |
| 4,674,963 | 6/1987 | Morishita et al. | 418/55.1 |
| 5,055,012 | 10/1991 | Sakashita et al. | 418/55.1 |

FOREIGN PATENT DOCUMENTS

| | | | |
|---|---|---|---|
| 4305876 | 9/1993 | Germany | 418/55.1 |
| 62-225793 | 10/1987 | Japan | 418/55.1 |
| 1162094 | 11/1989 | Japan . | |
| 4143477 | 5/1992 | Japan | 418/55.1 |
| 4117195 | 10/1992 | Japan . | |

*Primary Examiner*—John J. Vrablik

*Attorney, Agent, or Firm*—Burgess, Ryan and Wayne

[57] ABSTRACT

A scroll-type compressor comprising mutually mating stationary and movable scrolls for forming a compression chamber. The shell of the compressor comprises a center housing, a front housing, and a rear housing. The stationary scroll is integrally formed with the center housing. The movable scroll is carried by an eccentric shaft portion of a drive shaft which is rotatably supported by the front housing so that the movable scroll can move in an orbit. The center housing has a first set of bolt holes, and the front housing has a first set of threaded holes, so that a first set of fastening bolts are inserted in the first set of bolt holes from the rear side and screwed into the first set of threaded holes. Also, the rear housing has a second set of bolt holes, and the center housing has a second set of threaded holes, so that a second set of fastening bolts are inserted in the second set of bolt holes from the rear side and screwed into the second set of threaded holes. Thus, the first and second sets of fastening bolts can be inserted in the same direction, and the assembly of the compressor can be facilitated.

6 Claims, 5 Drawing Sheets

SCROLL-TYPE COMPRESSOR HAVING BOLTED HOUSINGS

BACKGROUND OF THE INVENTION

1. Field of the Invention

The present invention relates to a scroll-type compressor used, for example, in an automotive air conditioning system. In particular, the present invention relates to a fastening arrangement for a scroll-type compressor by which a center housing, a front housing, and a rear housing, together forming an outer shell of the compressor, can be easily assembled.

2. Description of the Related Art

A known scroll-type compressor has a housing and mating stationary and movable scrolls arranged in the housing. The stationary scroll comprises a base plate portion and a stationary scroll portion integrally formed with and extending from the base plate portion, and the movable scroll also comprises a base plate portion and a movable scroll portion integrally formed with and extending from the base plate portion for engagement with the stationary scroll portion. A self-rotation preventing mechanism is arranged between the housing and the movable scroll to prevent rotation of the movable scroll about its own axis. The drive shaft is rotatably supported in the front part of the housing and has an eccentric shaft portion at the inner end thereof, to which the movable scroll is connected so that the movable scroll can move in a circular orbit around the longitudinal axis of the drive shaft. When the movable scroll moves in an orbit around the longitudinal axis of the drive shaft while the self-rotation of the movable scroll about its own axis is prevented, a refrigerating medium is introduced from the suction chamber into the enclosed compression chamber formed between the stationary and movable scrolls, and compressed as the volume of the compression chamber is reduced, the compressed gas being discharged from the compression chamber into the outlet chamber via the outlet hole provided in the base plate portion of the stationary scroll.

The stationary scroll and the housing of the compressor are usually made separate from each other, as shown in Japanese Unexamined Utility Model Publication (Kokai) No. 1-162094. In this prior art, the stationary scroll is inserted in the housing near the bottom thereof, and fastened to the housing by fastening bolts which are inserted from the rear side of the housing. The movable scroll is then brought into an engagement with the stationary scroll, and the self-rotation preventing mechanism is then positioned to the rear surface of the base plate portion of the movable scroll. The front case is then attached to the front end of the housing and fastened to the latter by fastening bolts which are inserted from the front side of the housing. In addition, a front nose member incorporating the orbital mechanism for the movable scroll therein is attached to the front case and fastened to the latter by further fastening bolts.

In the conventional scroll-type compressor, the inserting direction of the fastening bolts which fasten the stationary scroll to the housing is opposite to the inserting direction of the fastening bolts which fasten the front case to the housing, and so it is necessary to turn the compressor 180 degrees during assembly on the manufacturing line. Therefore, there are the problems that the efficiency of the assembly work is low and that it is difficult to reduce the production cost of the compressor. Also, since the stationary scroll and the housing of the compressor are made separate from each other, the accuracy of the stationary and movable scrolls tends to be low, and the fluid tightness of the compression chamber is reduced, with the result that it is difficult to improve the volumetric efficiency of the compressor.

Another scroll-type compressor, intended for use in a home air-conditioner, has been proposed in Japanese Unexamined Utility Model Publication (Kokai) No. 4-117195 and, in the compressor a plurality of fastening bolts are inserted in the same direction. In this compressor, an electric motor is housed in a motor housing and a compressor unit comprising an end plate and a stationary scroll is attached to the motor housing. In the assembly work, the compressor unit, in which the stationary scroll is fastened to the compressor housing by fastening bolts, is first prepared. The orbital mechanism and the self-rotation preventing mechanism are then arranged at the inlet opening area in the motor housing, and the movable scroll is connected to the output shaft of the motor. The compressor unit is then attached to the compressor housing by more fastening bolts. Since a considerable member of steps are necessary to assemble the compressor, it can be said that the assembly work is not easy. In this case too, the stationary scroll and the end plate which corresponds to a part of the compressor housing are made separate from each other, and, as described above, the fluid tightness of the compression chamber is reduced, with the result that it is difficult to improve the volumetric efficiency of the pump.

SUMMARY OF THE INVENTION

The object of the present invention is to solve the above described problems and to provide a scroll-type compressor for which the assembly work can be facilitated and which has an improved volumetric efficiency.

Another object of the present invention is to provide a scroll-type compressor in which the number of the structural elements is reduced and the overall structure is simplified, to reduce the cost of manufacturing the compressor.

According to the present invention, there is provided a scroll-type compressor basically comprising a center housing having a front end, a rear end, an outer surface, and a stationary scroll integrally formed with the center housing, the stationary scroll including a base plate portion arranged at the rear end of the center housing and having an outlet hole, and a stationary scroll portion arranged on the base plate portion; a front housing attached to the center housing at the front end thereof and having an outer surface; a rear housing attached to the center housing at the rear end thereof for forming an outlet chamber therein and having an outer surface; a drive shaft rotatably supported to the front housing and having a first axis; a movable scroll including a base plate portion and a movable scroll portion on the base plate portion for engagement with the stationary scroll portion for forming a compression chamber between the stationary and movable scrolls, the movable scroll being connected to the drive shaft and having a second axis parallel to the first axis so that the movable scroll can revolve around the first axis but is prevented from rotating about the second axis, the compression chamber being communicable to the outlet chamber via the outlet hole; the center housing having a first set of bolt holes at the outer surface thereof for receiving a first set of fastening bolts; the front housing having a first set of threaded holes at the outer surface thereof for receiving the first set of fastening bolts which are inserted in the first set of bolt holes from the rear side; the rear housing having a second set of bolt holes at the outer surface thereof for receiving a second set of fastening bolts; and the center housing having a second set of threaded holes for receiving the second set of fastening bolts which are inserted in the second set of bolt holes from the rear side.

In this arrangement, the first set of fastening bolts and the second set of fastening bolts can be inserted in the same direction, and the rear housing can be attached to the center housing after the front housing is attached to the center housing. Therefore, the assembly work of the compressor can be facilitated. Since the stationary scroll is integrally formed with the center housing, the accuracy of the mating relationship between the stationary and movable scrolls, and the fluid tightness of the compression chamber and the volumetric efficiency of the pump are improved.

According to a modified form of the present invention, there is provided a scroll-type compressor comprising a center housing having a front end, a rear end, an outer surface, and a stationary scroll integrally formed with the center housing, the stationary scroll including a base plate portion arranged at the rear end of the center housing and having an outlet hole, and a stationary scroll portion arranged on the base plate portion; a front housing attached to the center housing at the front end thereof and having an outer surface; a rear housing attached to the center housing at the rear end thereof for forming an outlet chamber therein and having an outer surface; a drive shaft rotatably supported to the front housing and having a first axis; a movable scroll including a base plate portion and a movable scroll portion on the base plate portion for engagement with the stationary scroll portion for forming a compression chamber between the stationary and movable scrolls, the movable scroll being connected to the drive shaft and having a second axis parallel to the first axis so that the movable scroll can revolve around the first axis but is prevented from rotating about the second axis, the compression chamber being communicable to the outlet chamber via the outlet hole; the rear housing having a first set of bolt holes at the outer surface thereof for receiving a first set of through bolts, respectively; and the front housing having a first set of threaded holes for receiving the first set of through bolts which are inserted in the first set of bolt holes from the rear side, respectively, whereby the center housing is fastened between the front and rear housing by the fastening force of the through bolts.

In this arrangement, the center housing, the front housing and the rear housing can be fastened together by the through bolts, and the assembly work of the compressor can be further easily carried out. Also, the number of the structural elements is reduced and the overall structure is simplified, so it is possible to reduce the manufacturing cost of the compressor.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Figure 1:
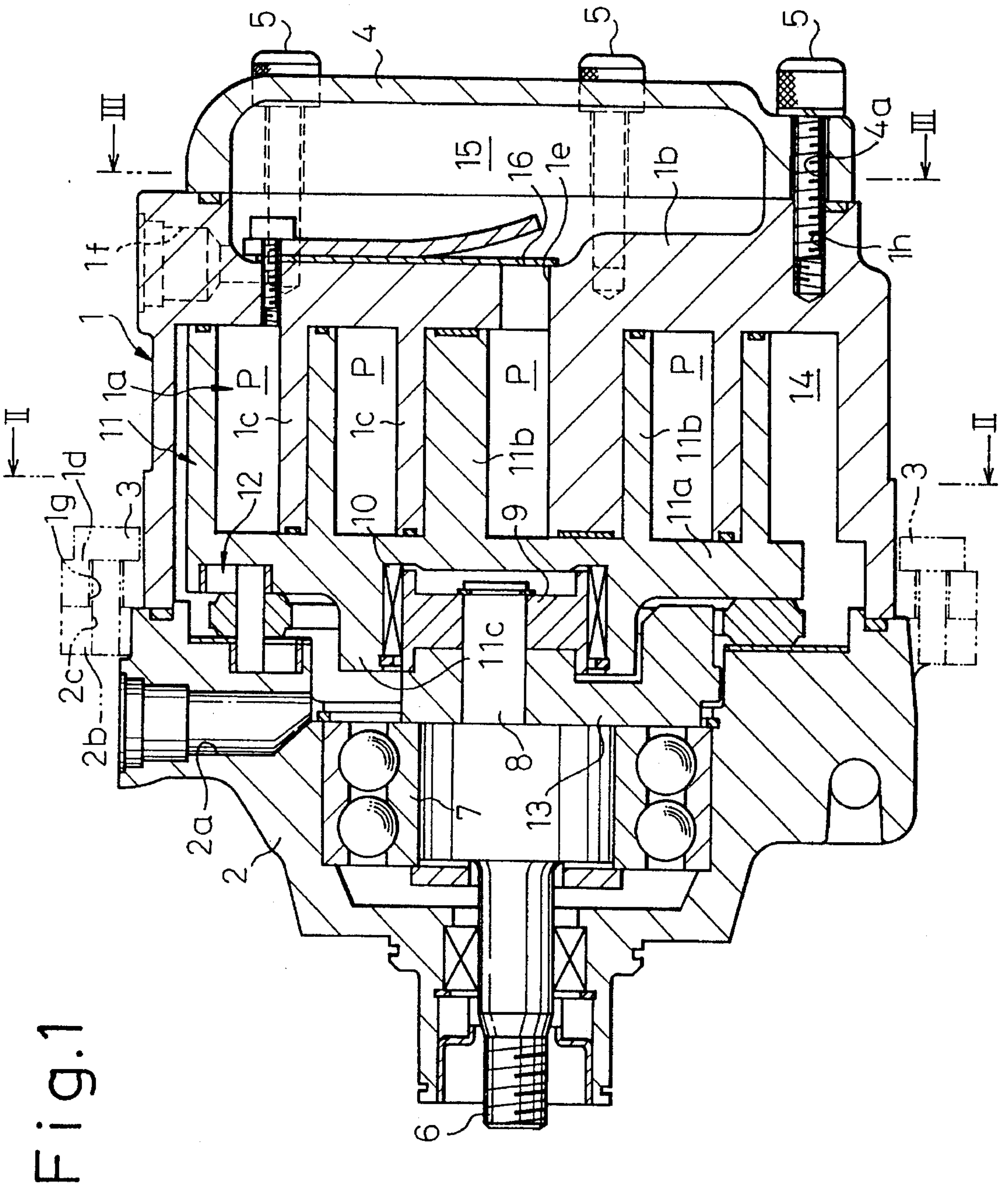
FIG. 1 is a cross,sectional view of the scroll-type compressor according to the first embodiment of the present invention.

FIGS. 1 to 4 show the scroll-type compressor according to the first embodiment of the present invention. As shown in FIG. 1, the compressor comprises a center housing 1 and a stationary scroll 1*a* comprising a stationary base plate portion 1*b* arranged at the rear end of the center housing 1 and a stationary scroll portion 1*c* integrally formed with and extending perpendicularly from the stationary base plate portion 1*b*. A front housing 2 is attached to the center housing 1 at the front end of the center housing 1 in an end-to-end facing relationship. The front housing 2 has an inlet 2*a* for introducing the refrigerating medium from an outside pipe into the front housing 2. The center housing 1 has a flange 1*d* on the outer surface thereof at the front end thereof, and the front housing 2 has a flange 2*b* on the outer surface thereof at the rear end thereof, the center housing 1 and the front housing 2 being fastened together by a first set of fastening bolts 3 arranged in the flanges 1*d* and 2*b*. Also, a rear housing 4 is attached to the center housing 1 at the rear end of the center housing 1 in an end-to-end facing relationship.

A drive shaft 6 is rotatably supported in the center of the front housing 2 by a radial bearing 7. The drive shaft 6 includes an eccentric shaft portion 8 at the inner end thereof, and a bush 9 is rotatably fitted on the eccentric shaft portion 8. A movable scroll 11 is supported by the bush 9 via a radial bearing 10. The movable scroll 11 comprises a movable base plate portion 11*a*, a movable scroll portion 11*b* integrally formed with and extending perpendicularly from the movable base plate portion 11*a*, and a boss portion 11*c* integrally formed with the back surface of the movable base plate portion 11*a*. The boss portion 11*c* is fitted on the radial bearing 10. When the drive shaft 6 is rotated, the eccentric shaft portion 8 moves in a certain circular orbit around the longitudinal central axis of the drive shaft 6 and the movable scroll 11 is thus moved in a certain circular orbit by the eccentric shaft portion 8 via the bush 9.

The self-rotation preventing mechanism 12 is arranged between the back surface of the movable base plate portion 11*a* of the movable scroll 11 and the inner wall surface of the front housing 2 to prevent the movable scroll 11 from rotating about its own axis (self-rotation). The self-rotation preventing mechanism 12 includes a function to restrict the orbital radius of the movable scroll 11. The eccentric shaft portion 8 carries a balance weight 13 for compensating for the dynamic unbalance of the centrifugal force on the movable scroll 11 during the orbital movement of the latter.

Figure 2:
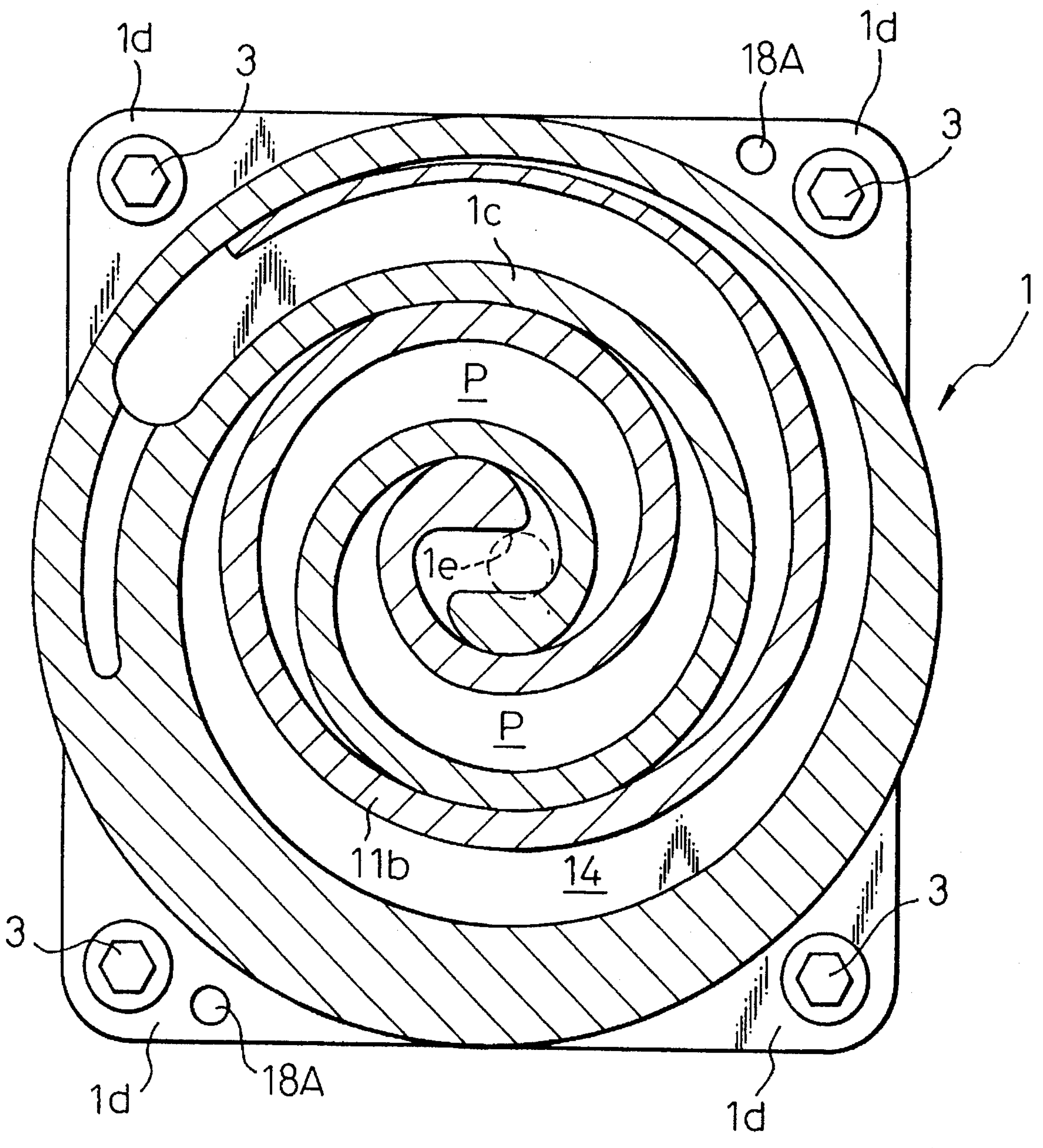
FIG. 2 is a cross-sectional view of the compressor, taken along the line II—II in FIG. 1.

The stationary scroll portion 1*c* of the stationary scroll 1*a* and the movable scroll portion 11*b* of the movable scroll 11*a* are in contact with each other at several points, as shown in FIG. 2. A suction chamber 14 is formed between the outer region of the scroll portions 1*c* and 11*b* and the inner wall of the center housing 1. A compression chamber P is formed between the scroll portions 1*c* and 11*b*, and the refrigerating medium moves from the inlet 2*a* through the suction chamber 14 into the compression chamber P. When the movable scroll 11 revolves on the orbit, the compression chamber P is displaced toward the central region of the scroll portions 1*c* and 11*b*, and the volume of the compression chamber P becomes smaller. An outlet chamber 15 is formed in the rear housing 4, the outlet chamber 15 being communicable with the compression chamber P, in the final stage of the compression stroke, via an outlet hole 1*e* arranged at the center of the stationary base plate portion 1*b*. An outlet valve 16 is arranged on the stationary base plate portion 1*b* to open and close the outlet hole 1*e*. A delivery port 1*f* is formed in the stationary base plate portion 1*b* for connecting the outlet chamber 15 to an outside pipe.

Figure 4:
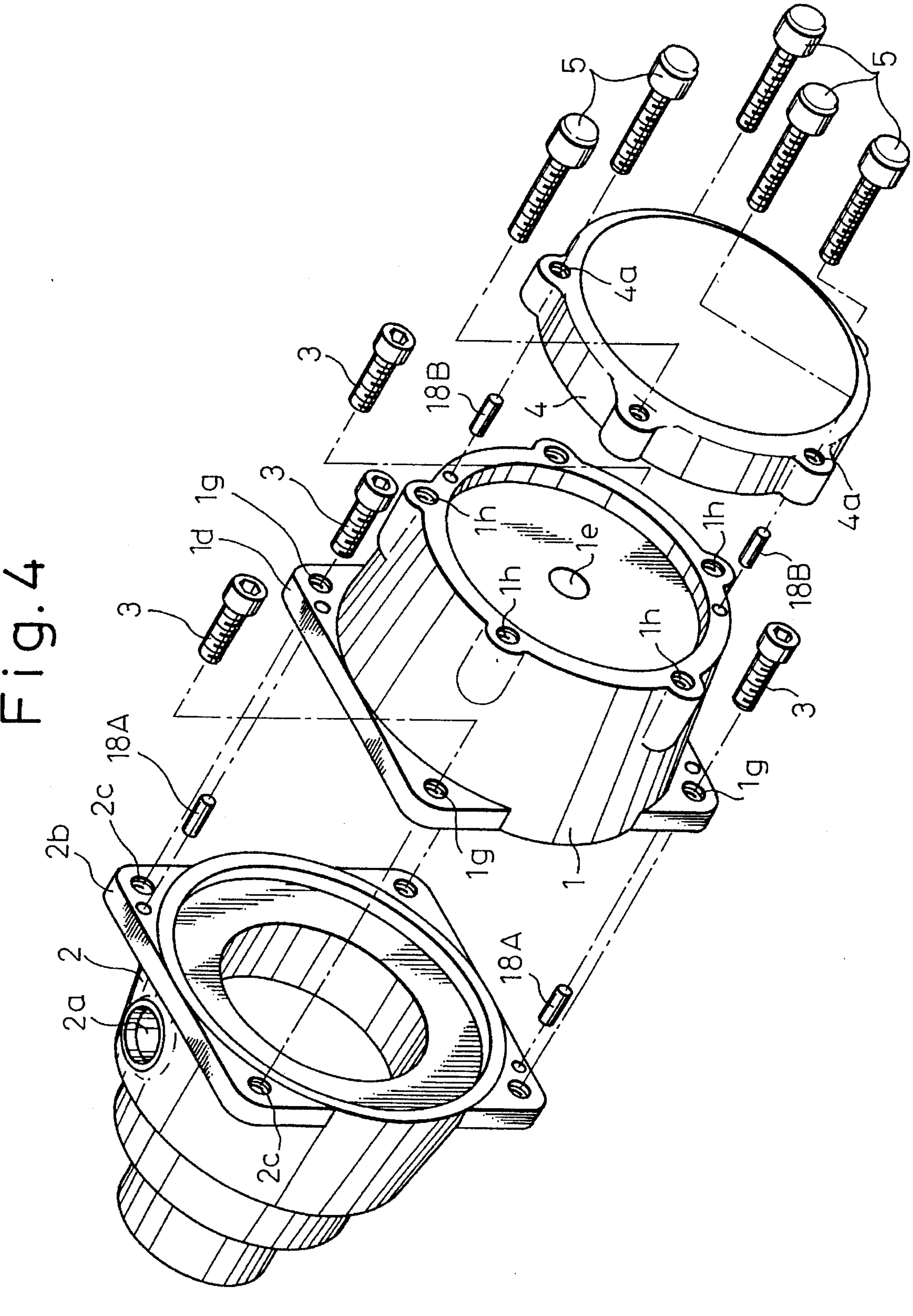
FIG. 4 is an exploded perspective view of the center housing, the front housing and the rear housing of the compressor of FIG. 1.

In this embodiment, a first set of (four in the embodiment) bolt holes 1*g* are formed in the flange 1*d* on the outer surface of the center housing 1 for receiving a first set of fastening bolts 3 as shown in FIGS. 1 and 4. A first set of threaded holes 2*c* are formed in the flange 2*b* on the outer surface of the front housing 2 for receiving the first set of fastening bolts 3. Each of the first set of bolts 3 is inserted in each of the first set of bolt holes 1*g* from the rear side of the compressor, and then screwed into each of the threaded holes 2*c* to fasten the center and front housings 1 and 2 together. A plurality of locating pins 18A are inserted in locating holes arranged in the flanges 1*d* and 2*b* during the assembly work.

A second set of (five in the embodiment) bolt holes 4*a* are formed in the radially protruding portions on the outer surface of the rear housing 4 for receiving a second set of fastening bolts 5. A second set of threaded holes 1*h* are arranged in the radially protruding portions on the outer surface of the center housing 1 for receiving the second set of fastening bolts 5. In this case too, each of the fastening bolts 5 are inserted in each of the second set of bolt holes 4*a* from the rear side of the compressor, and then screwed into each of the threaded holes 1*h* to fasten the center and rear housings 1 and 4 together. A plurality of locating pins 18B can be used during the assembly of the center and rear housings 1 and 4.

In FIG. 1, the drive bush 9 carries the movable scroll 11 via a bearing 10, is driven by the drive shaft 6 to cause the movable scroll 11 to revolve around the longitudinal axis 0 of the drive shaft 6, sucks a refrigerating gas into the suction chamber 14, compresses the gas in the compression chamber P and discharges the compressed gas from the compression chamber P during the revolution of the movable scroll 11.

During the operation of the scroll-type compressor, when the drive shaft 6 is rotated by a power source such as an engine of an automobile, the movable scroll 11 moves in a certain orbital radius according to the eccentric shaft portion 8 and the bush 9, with the self-rotation preventing mechanism 12 preventing the self-rotation of the movable scroll 11. In operating pump, the refrigerating medium moves from the suction chamber 14 into the compression chamber P, and the volume of the medium becomes smaller as it moves nearer the central region. The medium opens the outlet valve 16 and is discharged into the outlet chamber 15 via the outlet hole 1*e* arranged in the stationary base plate portion 1*b*. The medium is then delivered to an outside pipe via the delivery port if arranged in the upper part of the stationary base plate portion 1*b*.

Figure 3:
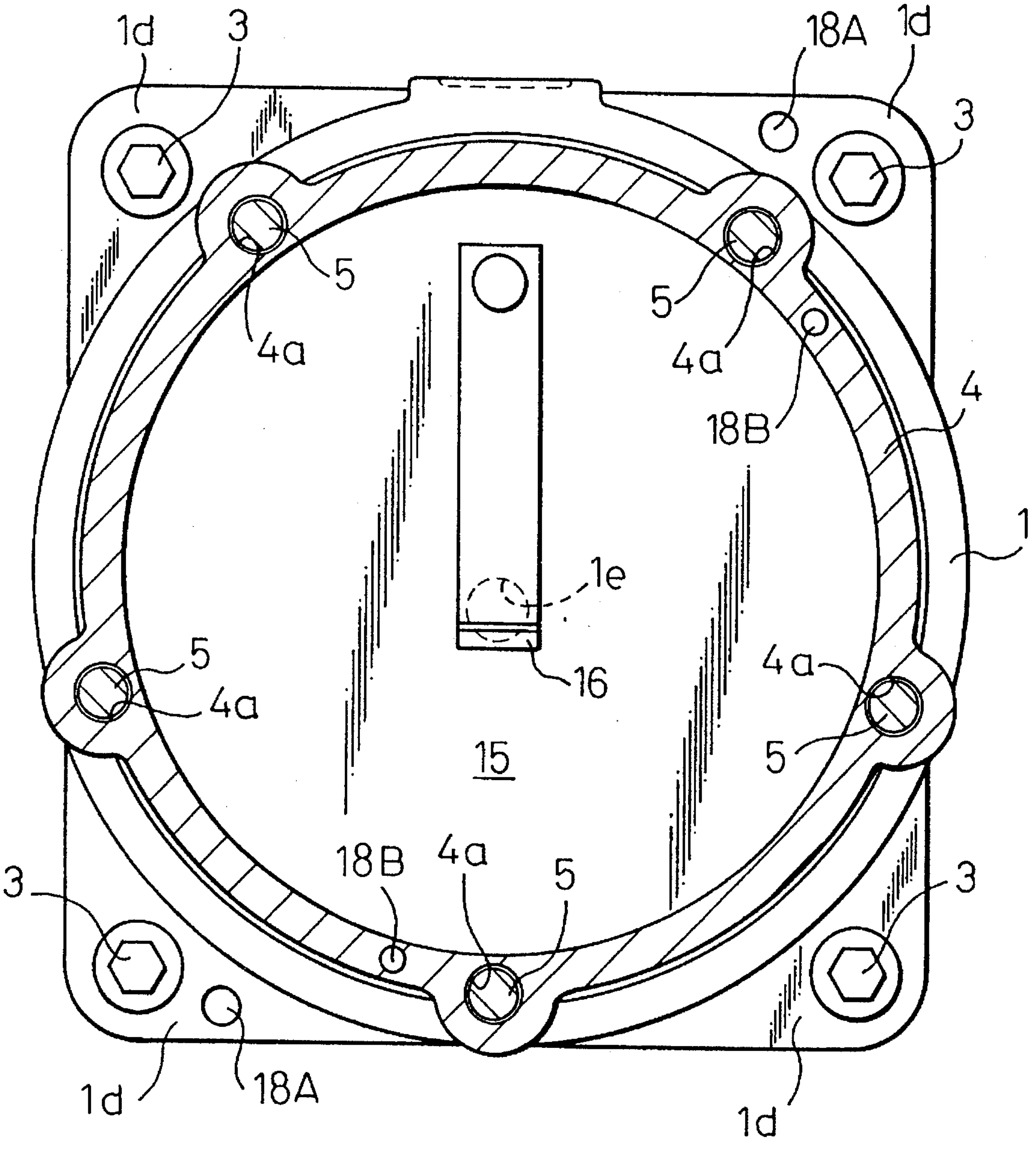
FIG. 3 is a cross-sectional view of the compressor, taken along the line III—III in FIG. 1.

The assembly of the scroll-type compressor is carried out as follows. Elements of the orbital mechanism such as the drive shaft 6 with the eccentric shaft portion 8, the bush 9 and the radial bearing 10 are assembled onto the front housing 2. The self-rotation preventing mechanism 12 is also assembled onto the front housing 2. The movable scroll 11 is mounted on the radial bearing 10 and on the self-rotation preventing mechanism 12. In this condition, the front end face of the center housing 1 having the stationary scroll 1*a* integrally formed therewith is attached to the rear end face of the front housing 2. The first set of fastening bolts 3 are inserted in the bolt holes 1*g* of the flange 1*d* from the rear side of the compressor, and screwed into the threaded holes 2*c* in the flange 2*b* to fasten the center housing 1 and the front housing 2 together. As shown in FIG. 2, FIG. 3 and FIG. 4, the fastening bolts can have heads with hexagonal holes.

The front end face of the rear housing 4 is attached to the rear end face of the center housing 1, the second set of fastening bolts 5 are then inserted in the bolt holes 4*a* of the rear housing 4 from the rear side of the compressor and screwed into the threaded holes 1*h* of the stationary base plate portion 1*b*, to fasten the rear housing 4 and the center housing 1 together.

In the first embodiment, since the inserting direction of the fastening bolts 3 is the same as the inserting direction of the fastening bolts 5, it is possible to assemble the front housing 4 onto the center housing 1 in one position and to subsequently assemble the rear housing 4 onto the center housing 1 in the same position. Therefore, it is possible to carry out the assembly work of the compressor without the need for reversing the position of the compressor. Since the stationary scroll 1*a* is integrally formed with the center housing 1, the accuracy of the mating relationship between the stationary and movable scrolls 1*a* and 11, that is, the contacting condition between the stationary and movable scrolls 1*a* and 11, is reliably ensured, and the fluid tightness of the compression chamber P and the volumetric efficiency of the compressor are improved.

Figure 5:
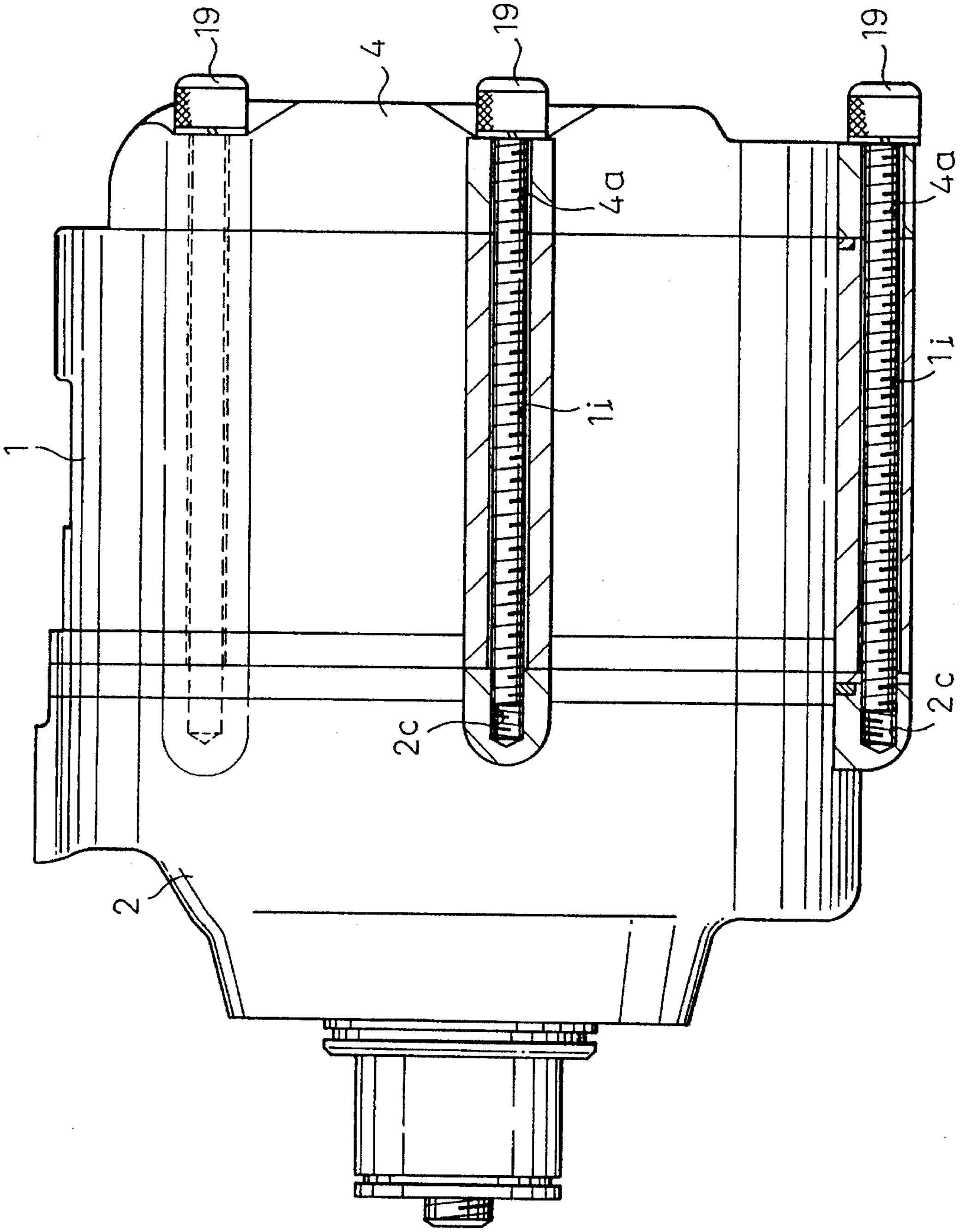
FIG. 5 is a partially cutaway side view of the scroll-type compressor according to the second embodiment of the present invention.

FIG. 5 shows the scroll-type compressor according to the second embodiment of the present invention. The compressor comprises a center housing 1, a front housing 2 attached to the center housing 1, and a rear housing 4 attached to the center housing 1. These housings 1, 2, and 4 are arranged in a similar manner to those of the first embodiment, except for the fastening means. It should be understood that these housings 1, 2, and 4 include elements similar to those in FIGS. 1 to 4. In brief, the center housing 1 includes a stationary scroll 1*a* integrally formed with the center housing 1, the stationary scroll 1*a* comprising a stationary base plate portion 1*b* and a stationary scroll portion 1*c*. A drive shaft 6 having an eccentric shaft portion 8 is rotatably supported in the front housing 2, and a bush 9 is rotatably fit on the eccentric shaft portion 8. A movable scroll 11 comprising a movable base plate portion 11*a* and a movable scroll portion 11*b* is supported by the bush 9 via a radial bearing 10. The movable scroll 11 is moved in an orbit by the rotating drive shaft 6, and a self-rotation preventing mechanism 12 is arranged between the movable base plate portion 11*a* and the front housing 2. A compression chamber P is formed between the scroll portions 1*c* and 11*b*, and an outlet chamber 15 is formed in the rear housing 4, the outlet chamber 15 being communicable with the compression chamber P via an outlet hole 1*e* arranged in the stationary base plate portion 1*b*. An outlet valve 16 is arranged on the stationary base plate portion 1*b* to open and close the outlet hole 1*e*.

In this embodiment, a first set of bolt holes 4*a* are arranged in the flanged or protruding portion of the outer surface of the rear housing 4 for receiving a first set of through bolts 19, respectively. A first set of bolt holes 1*i* are also arranged in the flanged or protruding portion of the outer surface of the center housing 1 in alignment with the bolt holes 4*a*. In addition, a first set of threaded holes 2*c* are arranged in the flanged or protruding portion of the outer surface of the front housing 2 for receiving the first set of through bolts 19, respectively. Each of the through bolts 19 is inserted in each of the bolt holes 4*a* in the rear housing 4 from the rear side of the compressor, passed through each of the bolt holes 1*i* in the center housing 1, and screwed into each of the threaded holes 2*c* in the front housing 2, whereby the center housing 1 is fastened between the front and rear housing 2 and 4 by the fastening force of the through bolts 19.

Therefore, the center housing 1, the front housing 2, and the rear housing 4 are fastened together by the through bolts 19, and the assembly work of the compressor can be easily carried out. Also, the number of the structural elements is reduced and the overall structure is simplified, so it is possible to reduce the manufacturing cost of the compressor.

The present invention has been described with reference to the illustrated embodiments but it should be understood that the present invention is not limited to the illustrated embodiments but that modifications can be made within the scope of the present invention. For example, it is possible to arrange the threaded holes 2*c* and 1*h*, for threadably receiving the fastening bolts 3, 5, or 19, in the form of nuts which can be embedded in or appropriately fixed to the housing. It is also possible to omit the bolt holes 1*i* in the center housing 1 in the second embodiment so that the intermediate portions of the through bolts 19 are exposed.

We claim:

1. A scroll-type compressor comprising:

a center housing having a front end, a rear end, an outer surface, and a stationary scroll integrally formed with the center housing, the stationary scroll including a base-plate portion arranged at the rear end of the center housing and having an outlet hole, and a stationary scroll portion arranged on the base plate portion;

a front housing attached to the center housing at the front end thereof and having an outer surface;

a rear housing attached to the center housing at the rear end thereof for forming an outlet chamber therein and having an outer surface wherein the center housing, front housing and rear housing form an outer shell of the compressor;

a drive shaft rotatably supported by the front housing and having a first axis;

a movable scroll including a base plate portion and a movable scroll portion on the base plate portion for engagement with the stationary scroll portion to form a compression chamber between the stationary and movable scrolls, the movable scroll being connected to the drive shaft and having a second axis parallel to the first axis so that the movable scroll can revolve around the first axis and having means to prevent rotation about the second axis, the compression chamber communicating with the outlet chamber via the outlet hole;

the center housing having a first set of bolt holes at the outer surface thereof for receiving a first set of fastening bolts;

the front housing having a first set of threaded holes at the outer surface thereof for receiving the first set of fastening bolts which are inserted in the first set of bolt holes from the rear side;

the rear housing having a second set of bolt holes at the outer surface thereof for receiving a second set of fastening bolts; and the center housing having a second set of threaded holes for receiving the second set of fastening bolts which are inserted in the second set of bolt holes from the rear side.

2. The compressor of claim 1, wherein the drive shaft, the rotation preventing means, the movable scroll, the center housing, and the rear housing are assembled relative to the front housing in the same direction as that of the bolt inserting direction.

3. The compressor of claim 1, wherein the first set of bolts and the second set of bolts are arranged at such positions that the first set of bolts and the second set of bolts do not interfere with each other when viewed in the axial direction.

4. The compressor of claim 3, wherein the first set of bolts are arranged on an outer side of the second set of bolts.

5. The compressor of claim 4, wherein the center housing has a flange outwardly projecting from the outer surface thereof, and the first set of bolt holes for receiving the first set of bolts are arranged in the flange.

6. The compressor of claim 4, wherein the bolts have heads with hexagonal holes.

* * * * *